Dec. 11, 1956 — W. W. SLAGHT — 2,773,367
SEALED TRUNNION BEARINGS IN UNIVERSAL COUPLINGS OF THE CROSS AND YOKE TYPE
Filed July 26, 1952 — 2 Sheets-Sheet 1
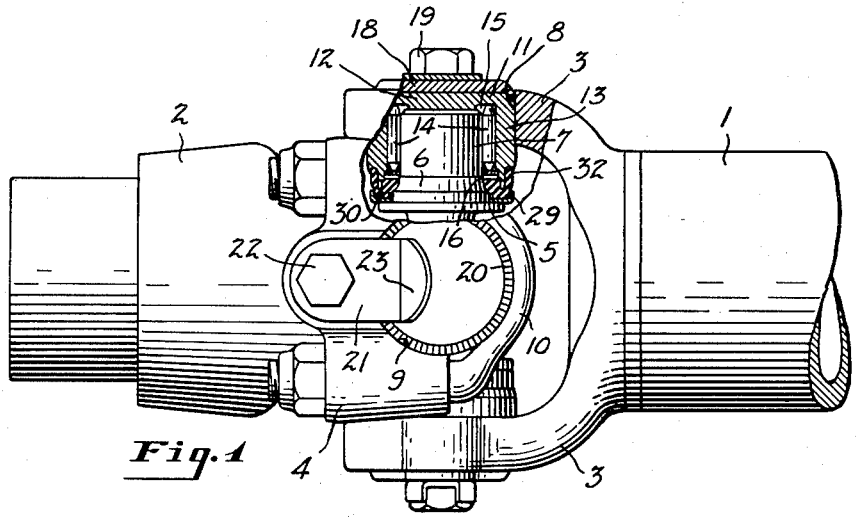
Fig. 1
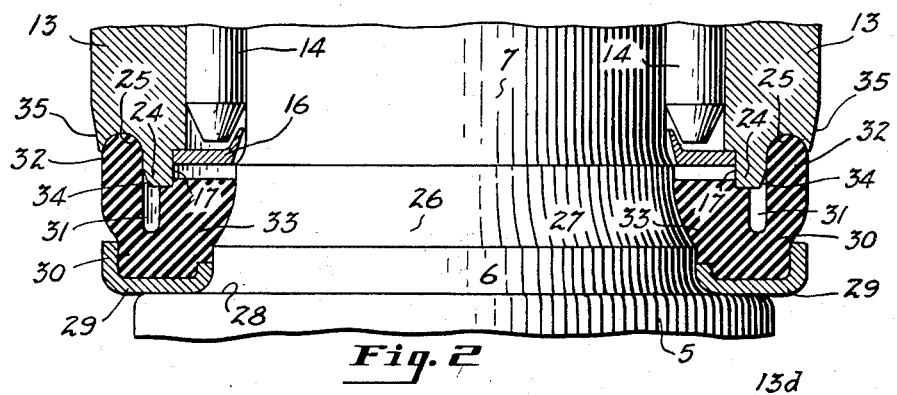
Fig. 2
Fig. 3  Fig. 4  Fig. 5  Fig. 6
INVENTOR
William W. Slaght
BY Evans & McCoy
ATTORNEYS ary # United States Patent Office 2,773,367
Patented Dec. 11, 1956

2,773,367

SEALED TRUNNION BEARINGS IN UNIVERSAL COUPLINGS OF THE CROSS AND YOKE TYPE

William W. Slaght, Rocky River, Ohio, assignor to Cleveland Steel Products Corporation, Cleveland, Ohio, a corporation of Ohio Application July 26, 1952, Serial No. 301,036

8 Claims. (Cl. 64—17)

This invention relates to universal couplings of the cross and yoke type and particularly to the sealing of the trunnion bearings of such couplings.

The cross trunnions of universal couplings are commonly journaled in bearing cups that are mounted in yoke arms that are disposed laterally of the axis of rotation of the coupling and the trunnions oscillate in the bearing cups during rotation of the coupling. In universal couplings used in motor vehicle transmissions it is extremely important that the trunnion bearings be protected against the entry of dirt and water thereto and when such motor vehicles are subjected to severe operating conditions the conventional seals have been found to be inadequate.

The seal of the present invention is in the form of a collar that has sealing engagement with the bearing cup and with the trunnion arm inwardly of the cup. The body of the collar is formed of elastic rubber, the outer end portion of which is stretched around the inner end portion of the bearing cup and in gripping engagement therewith. The collar is preferably of an external diameter no greater than that of the cup so that it can be passed through the yoke arm opening in which the bearing arm is mounted so that the seal of one bearing can be replaced without disturbing the other coupling bearings.

The elastic rubber body of the sealing collar is preferably under compression between the inner end of the bearing cup and a sealing shoulder on the trunnion arm so as to maintain an effective sealing engagement between the sealing collar and the bearing cup and between the sealing collar and the trunnion arm. The sealing collar is also so formed that it provides an annular chamber that will retain a body of lubricant between the inner end of the bearing cup and the axis of the coupling. The lubricant retaining chamber is open to the inner end of the bearing cup so that centrifugal force acting upon the lubricant in the chamber during rotation of the coupling will create a pressure that will force the lubricant outwardly between the sealing collar and the periphery of the cup wall to maintain a film of lubricant between the collar and wall that tends to flow outwardly and that resists entry of foreign matter into the bearing.

The lubricant chamber is preferably in the form of an annular channel open throughout its circumference to the inner end of the bearing cup and of considerable depth so that the collar has inner and outer tubular portions which are independently flexible and which are adapted to have gripping engagement one with the periphery of the cup and the other with the trunnion arm.

Objects of the invention are to provide a sealing collar than can be individually removed and replaced without disturbing other bearings of the coupling and to provide a seal so disposed that foreign matter must move radially inwardly past the seal in order to enter the bearing, and so constructed that it will retain a body of fluid lubricant therein which when subjected to centrifugal force upon rotation of the coupling, tends to force lubricant between the sealing collar and the bearing member in a direction to oppose entry of foreign matter into the bearing.

Reference should be had to the accompanying drawings forming a part of this specification in which:

Figure 1 is a side elevation of a universal coupling to which the invention is applied, portions of the coupling being broken away to show one of the trunnion bearings in section;

Fig. 2 is a fragmentary section on an enlarged scale through the sealing collar and the portion of the bearing cup engaged thereby;

Fig. 3 is a fragmentary sectional view showing a modified form of sealing collar that is formed to provide a relatively large lubricant chamber.

Fig. 4 is a fragmentary sectional view showing a sealing collar of a form similar to the collar shown in Fig. 3 but composed entirely of rubber;

Fig. 5 is a fragmentary sectional view showing another form of sealing collar embodying the invention;

Fig. 6 is a fragmentary sectional view showing a sealing collar that provides a lubricant chamber that is open to the bearing;

Figure 7:
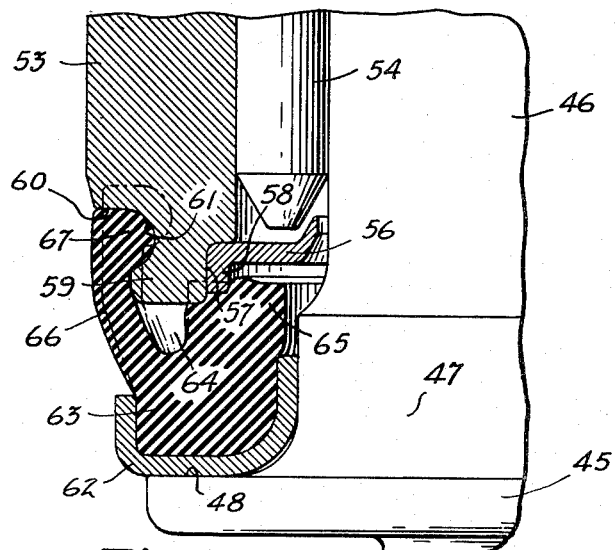
Figure 8:
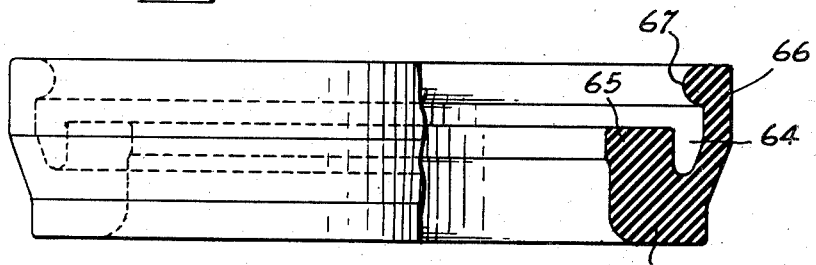

Fig. 7 is a fragmentary section on an enlarged scale showing a sealing collar that is held in place under compression axially of the trunnion and that has a tubular portion that is held in gripping engagement with the bearing cup that is under substantial circumferential tension; and Fig. 8 is a sectional elevation of the rubber collar shown in Fig. 7 showing the form in which the collar is molded.

In the accompanying drawings Figs. 1 and 2 show a trunnion bearing seal embodying the invention applied to a universal coupling. The trunnion seals shown in section in other views are designed for use in universal couplings such as shown in Fig. 1.

In Fig. 1 of the drawings the invention is shown applied to a universal coupling having yokes 1 and 2 provided with arms 3 and 4 that are substantially equally spaced from the axis of the coupling. The yokes are joined by a cross 5 that has arms 6 terminating in trunnions 7 that are journaled in the yoke arms 3 and 4. The arms 3 of the yoke 1 are one-piece arms provided with alined cylindrical openings 8. The arms 4 of the yoke 2 are two-part arms each having a semi-cylindrical seat 9 and a U-bolt 10 that has a semi-cylindrical seating portion that completes an opening in the yoke arms 4 corresponding to the openings 8 in the yoke arms 3. Bearing cups 11 are mounted in the yoke arm openings and each bearing cup has an integral bottom 12 and a cylindrical wall 13 that fits in the yoke opening. Each cup has bearing rollers 14 mounted therein between the wall 13 and the trunnion 7, the rollers 14 being mounted between an annular recess 15 in the bottom 12 and a retaining ring 16 that has a press fit in a counterbore 17 at the inner end of the cylindrical wall 13. Bearing cups mounted in the openings 8 of the yoke arms 3 are retained by plates 18 extending across the openings 8 and secured to the outer faces of the arms 3 by bolts 19. The retaining plates 18 engage with a serrated beveled edge 20 on the bearing cup to hold the cup against rotation. The bearing cups mounted in the openings of the yoke arms 4 are retained by lugs 21 secured to the yoke arms 4 by bolts 22, the lugs 21 having inclined outer ends 23 which facilitate the entry of the bearing cups into the concave seats 9 and the bearing cups are held against rotation in the openings of the yoke 4 by the clamping action of the U-bolts 10.

The cylindrical wall 13 of the bearing cup has an annular projection 24 at its inner end the inner face of which is formed by the counterbore 17 and the outer face of which is of a diameter less than the external diameter of the wall 13. Outwardly of the projection 24 the inner end of the wall 13 has an annular seating shoulder 25 which may be of concave form as shown in Fig. 2.

The trunnion arm 6 has a tapering concave shoulder 26 inwardly of the trunnion 7 and an enlarged cylindrical portion 27 inwardly of the tapered shoulder 26. Inwardly of the enlarged portion 27 the arm has a seating shoulder 28. A sealing collar comprising a retaining channel 29 and a rubber body 30 is interposed between the inner end of the cylindrical wall 13 of the bearing cup and the shoulder 28 of the trunnion arm. The retaining channel 29 may have a press fit on the enlarged portion 27 of the trunnion arm and the rubber body 30 has its outer end recessed to receive the projection 24 of the bearing cup and is of an axial length such that it is under compression between the bearing cup and the shoulder 28 when the coupling is assembled. The rubber body 30 has an annular recess 31 formed therein that opens throughout the circumference of the collar to the inner end of the projection 24 of the bearing cup. The annular recess 31 is of substantial depth and provides the elastic rubber body with outer and inner independently flexible tubular portions 32 and 33 that are adapted to have gripping engagement with the exterior of the projection 24 of the bearing cup and with the trunnion arm 6. The rubber body 30 is preferably molded to a shape such that the outer ends of the tubular portions 32 and 33 are normally of internal diameters less than the external diameters of the projection 24 and the shoulder 26.

The projection 24 of the wall 13 has a beveled outer edge 34 that serves to guide the outer tubular portion 32 of the sealing collar onto the external cylindrical surface of the projection 24. The length of the rubber body 30 is such that when the bearing cup is secured in place by the plate 18 or lug 21 the rubber body will be placed under axial compression between the inner end of the cylindrical wall 13 of the cup and the retaining channel 29. This compression of the sealing collar serves to maintain tight engagement between the outer end of the collar and the seat 25 and also serves to compress the inner tubular portion 33 of the collar between the inner end of the projection 24 and the tapering shoulder 26 of the trunnion arm so that the collar has effective sealing engagement both with the bearing cup and with the trunnion arm.

Outwardly of the shoulder 25 the wall 13 may be of an external diameter somewhat greater than the external diameter of the sealing collar and, in order to permit free passage of foreign matter acted upon by centrifugal force past the seat 25, the wall 13 may be beveled as shown at 35.

The annular recess 31 provides a reservoir which may be filled with a suitable fluent lubricant prior to assembly of the bearing. This lubricant in the chamber 31 may be the same lubricant as that in which the bearing is packed, or it may be a different lubricant when the lubricant of the bearing does not have the viscosity and the physical properties desirable for sealing. Each bearing cup can be removed outwardly through the yoke arm opening in which it is mounted when desired and, since the sealing collars are of the same or somewhat less external diameter than the bearing cups, the sealing collar of any bearing can be removed and replaced without disturbing the other bearings.

In Fig. 3 of the drawings a seal is shown which is in general similar to that shown in Figs. 1 and 2. The trunnion arm has a tapering concave shoulder 26a corresponding to the shoulder 26 and an enlarged cylindrical portion 27a which is of greater length than the cylindrical portion 27 in the modification first described. The seating shoulder 28a corresponds substantially to the seating shoulder 28 and a mounting channel 29a seated on the shoulder 28a carries an elastic rubber body 30a that has sealing engagement with the wall 13a of the sealing cup and with the portions 26a and 27a of the trunnion arm. The rubber body 30a is of somewhat greater axial depth than in the modification first described and is formed to provide a lubricant receiving recess 31a of considerably greater volumetric capacity than the recess 31 in the modification first described. The recess 31a extends to near the inner end of the rubber body, opens to the inner end of the projection 24a of the bearing cup and is widened intermediate its inner and outer ends to provide a chamber adapted to receive a relatively larger volume of lubricant.

The body 30a is provided with outer and inner independently flexible tubular portions 32a and 33a, the outer tubular portion 32a having gripping engagement exteriorly with the projection 24a and engaging a flat seat 25a on the end of the wall 13a outwardly of the projection 24. The inner tubular portion 33a is clamped between the projection 24a and the shoulder 26a of the trunnion arm. As in the modification first described, the outer portion of the tubular body is preferably molded to a diameter somewhat less than it has when in place on the trunnion bearing so that the portions 32 and 33a have gripping engagement with the projection 24a and the trunnion arm.

In Fig. 4 of the drawings the trunnion arm has substantially the same form as the trunnion arm shown in Fig. 3 but the sealing collar is composed entirely of rubber and seats directly upon the seating shoulder 28b of the trunnion arm. The sealing collar 30b has a circumferentially continuous lubricant chamber 31b that is substantially rectangular in cross section and that is open throughout its circumference to the inner end of a projection 24b on the inner end of the cylindrical wall 13b of the bearing cup. As in the modifications previously described, the sealing collar has outer and inner independently sealing portions 32b and 33b that have gripping engagement with the periphery of the projection 24 and with the trunnion arm. The outer edge of the sealing collar is recessed to receive the projection 24b of the bearing cup and is compressed between the bearing cup and trunnion arm in substantially the same manner as the sealing collar shown in Fig. 3.

In Fig. 5 of the drawings the trunnion arm is provided with a concave tapering shoulder 26c which is longer and wider than the tapering shoulder in the previous modifications and also has an enlarged cylindrical portion 27c and shoulder 28c which receives a mounting channel 29c in which a rubber sealing collar 30c is mounted. The cylindrical wall 13c of the bearing cup has a projection 24c that is provided with a rounded face 36 that has a more gradual taper toward the interior of the cylindrical wall than toward the exterior thereof. The rubber sealing collar 30c has an annular recess 31c that opens to the curved face 36 of the projection 24c. The recess 31c opens to the inwardly tapering portion of the face 36 and separates outer and inner independently flexible tubular gripping portions 32c and 33c which have gripping engagement with the projection 24c and with the trunnion arm. As in the modification previously described the rubber body is compressed between the inner end of the bearing cup and the trunnion arm. The lubricant retained within the chamber 31c serves to provide a film of lubricant between the rubber sealing member and the bearing cup and tends to maintain a flow of such film in a direction opposed to entry of foreign matter into the bearing.

In Fig. 6 of the drawings the sealing collar has a mounting channel 29d and a rubber body 30d that has a relatively thin tubular wall 38 that is of substantially cylindrical form and of an external diameter when in place on the sealing cup which is substantially the same as the external diameter of the sealing cup, the sealing cup having an inner end portion 40 of reduced external diameter adjacent its inner end to receive the tubular wall 38 of the sealing collar. Inwardly of the bearing cup a lubricant retaining space 39 is provided between the inner end of the bearing cup and the inner end portion of the sealing collar. The lubricant from this space is pressed by centrifugal force in an outward direction during rotation of the coupling, tending to maintain a film of lubricant between the tubular wall 38 of the sealing collar and the reduced end portion of the bearing cup. The reduced portion 40 of the bearing cup is provided with a circumferential groove 41 and the tubular wall 38 is provided with an internal rib 42 which fits in the groove 41 to provide a more effective seal between the sleeve and cup. The internal diameter of the cup engaging portion of the tubular wall 38 is normally less than the external diameter of the reduced portion 40 of the bearing cup so that the wall 38 is stretched around and has gripping engagement with the reduced portion 40 of the bearing cup.

In Figs. 7 and 8 of the drawings the coupling is provided with a trunnion arm 45 that terminates in a cylindrical trunnion 46 and that has an enlarged cylindrical portion 47 inwardly of the trunnion, a shoulder 48 being provided inwardly of the cylindrical portion 47. A bearing cup 53 contains bearing rollers 54 that are interposed between the interior of the cup 53 and the trunnion 46, the rollers 54 being retained by a ring 56 that has a press fit in a counterbore 57 at the inner open end of the cup. The ring 56 has an inwardly projecting peripheral flange 58 that fits in the counterbore 57. The bearing cup has an inner end portion 59 of reduced external diameter, a shoulder 60 at the outer end of the reduced portion 59 and a circumferential recess or groove 61 in the reduced portion.

A channel-shaped metal ring 62 has a press fit on the cylindrical portion 47 of the trunnion arm and receives an elastic rubber collar 63 that fits in the channel of the ring 62 and that may be bonded to the ring 62. The rubber collar 63 has a circumferential recess 64 that provides inner and outer annular cup engaging portions 65 and 66. The inner portion 65 is engaged by the inner end of the bearing cup and by the inner end of the flange 58 of the roller retaining ring 56. The outer portion 66 of the rubber collar is stretched around the reduced inner end portion 59 of the bearing cup and has a thickened bead portion 67 at its outer end that fits in the circumferential recess 61 of the bearing cup. The external diameters of the ring 62 and sealing collar are less than that of the bearing cup, so that the sealing collar and its base ring are readily removable through the yoke arm opening.

The rubber collar 63 is under compression between the inner end of the bearing cup 53 and the shoulder 48 of the trunnion arm. The inner end of the flange 58 of the retaining ring 56 and the adjacent portion of the inner end of the bearing cup are pressed into the outer end of the inner portion 65 of the collar 63 and the shoulder 60 presses the outer portion 66 of the collar 63 inwardly. The axial compression of the collar 63 from the position shown in dotted lines in Fig. 7 causes an outward pressure to be exerted by the outer portion 66 of the collar 63 against the shoulder 60 and by the inner portion 65 against the inner end of the cup and the flange 58 of the bearing ring. Also the stretching of the tubular portion 66 causes radial pressure to be exerted upon the external face of the reduced portion 59 of the bearing cup. The normal shape of the ring 63 is shown in Fig. 8 and is indicated in dotted lines in Fig. 7. The recess 64 provides a chamber for lubricant which is acted upon by centrifugal force during rotation of the coupling to create pressure that is uniform throughout the circumference of the bearing and that tends to cause the lubricant to flow outwardly between the exterior of the reduced portion 59 of the bearing cup and the interior of the tubular portion 66 of the sealing collar.

In each of the embodiments of the invention herein shown and described, the sealing collar is of an external diameter no greater than that of the bearing cup and is removable or insertable through the yoke arm opening so that any one of the sealing rings may be replaced without disturbing the others. In each embodiment of the invention the inner end portion of the bearing cup is gripped by an elastic sealing collar which is formed to provide a lubricant space opening to the inner end of the bearing cup so that centrifugal force acting upon lubricant in the said space tends to cause lubricant to flow radially outwardly uniformly throughout the circumference of the trunnion bearing between the sealing collar and bearing cup.

It is to be understood that in accordance with the provisions of the patent statutes, variations and modifications of the specific devices herein shown and described may be made without departing from the spirit of the invention.

What I claim is:

1. In a universal coupling having a yoke provided with an arm spaced laterally from the axis of rotation of the coupling and a cross provided with an arm extending outwardly from said axis of rotation and terminating in a trunnion, the improvement which comprises: a sealed bearing for said trunnion comprising a bearing cup on said trunnion and attached to said arm, said cup having a peripheral wall surrounding said trunnion and terminating adjacent the inner end thereof, and a flexible and elastic sealing collar surrounding said trunnion arm and having a circumferentially continuous portion engaging the inner end of said cup wall throughout the circumference thereof, said collar being formed to provide a lubricant reservoir extending throughout its circumference between the inner end of said cup wall and the coupling axis and opening to the inner end of said wall radially inwardly of said continuous portion, whereby during rotation of the coupling lubricant is retained in said reservoir by said continuous portion and is subjected to centrifugal force tending to cause outward flow between the outer end of said collar and said bearing cup.

2. In a universal coupling having a yoke provided with an arm spaced laterally from the axis of rotation of the coupling and a cross provided with an arm extending outwardly from said axis of rotation and terminating in a trunnion, the improvement which comprises: a sealed bearing for said trunnion comprising a bearing cup on said trunnion and attached to said arm, said cup having a peripheral wall surrounding said trunnion and terminating adjacent the inner end thereof, and a flexible and elastic sealing collar surrounding said trunnion arm and having a circumferentially continuous portion engaging the inner end of said cup wall throughout its circumference, said collar having an annular recess opening to said continuous wall engaging portion radially inwardly of said continuous portion and of the periphery of said wall and providing a lubricant reservoir between the inner end of said cup wall and the axis of the coupling in which lubricant is retained by said continuous portion.

3. In a universal coupling having a yoke provided with an arm spaced laterally from the axis of rotation of the coupling and a cross provided with an arm extending outwardly from said axis of rotation and terminating in a trunnion, the improvement which comprises: a sealed bearing for said trunnion comprising a bearing cup on said trunnion and attached to said arm, said cup having a peripheral wall surrounding said trunnion and terminating adjacent the inner end thereof, and a flexible and elastic sealing collar surrounding said trunnion arm and having a circumferentially continuous portion engaging the inner end of said cup wall, said collar having an annular recess opening to said continuous wall engaging portion radially inwardly of the periphery of said wall and providing a lubricant reservoir between the inner end of said cup wall and the axis of the coupling, said recess opening to the wall engaging portion of the collar throughout the circumference thereof and providing an annulus surrounding it for gripping engagement with the cup wall periphery throughout its circumference to retain lubricant in said reservoir and an independently flexible annulus within it for gripping engagement with the trunnion arm.

4. In a universal coupling having a yoke provided with an arm spaced laterally from the axis of rotation of the coupling and a cross provided with an arm extending outwardly from said axis of rotation and terminating in a trunnion, said cross arm having a circumferential shoulder inwardly of said trunnion, the improvement which comprises: a bearing cup on said trunnion and mounted in said yoke arm, said cup having a peripheral wall surrounding said trunnion and terminating adjacent the inner end thereof, an elastic rubber sealing collar surrounding said trunnion arm and interposed between said cup and said shoulder, said collar being formed to provide an annular lubricant reservoir within said collar that opens outwardly away from said axis of rotation to the inner end of said peripheral wall of the bearing cup and cup retaining means carried by said yoke arm for applying an axial thrust to said cup to compress said collar between said shoulder and said cup.

5. In a universal coupling having a yoke provided with an arm spaced laterally from the axis of rotation of the coupling, a cross provided with an arm extending outwardly from said axis of rotation and terminating in a trunnion, said cross arm having a cylindrical portion of greater diameter than the trunnion inwardly of the trunnion, and a tapering shoulder between said cylindrical portion and trunnion and a seating shoulder at the inner end of said cylindrical portion, the improvement which comprises: a bearing cup on said trunnion and mounted in said yoke arm, said cup having a peripheral wall surrounding the trunnion and terminating adjacent the inner end thereof, said peripheral wall having a projection at its inner end that is of reduced external diameter, an elastic rubber sealing collar surrounding said trunnion arm and interposed between said cup and said seating shoulder, said collar having an annular recess the inner and outer sides of which engage said projection interiorly and exteriorly, and a relatively deep annular recess opening to said first mentioned recess intermediate the sides thereof and forming a lubricant reservoir within said collar, said collar having an outer portion engaging the exterior periphery of said projection throughout its circumference to retain lubricant in said reservoir and an independently flexible portion inwardly of said recess clamped between the inner end of said cup and said tapering shoulder.

6. In a universal coupling, a yoke provided with an arm spaced laterally from the axis of rotation of the coupling, a cross having an arm extending outwardly from said axis of rotation and terminating in a trunnion that extends into an opening in said yoke, a sealed bearing for said trunnion comprising a bearing cup on said trunnion and positioned in said opening, said cup being held against turning movement in said opening and being removable outwardly through said opening, said cup having an inner end portion of reduced external diameter that is provided with a circumferential groove, and an elastic rubber sealing collar of an external diameter no greater than that of the bearing cup, said collar embracing said trunnion arm and having a tubular outer end portion of an internal diameter normally less than the external diameter of said reduced inner end portion of the bearing cup that grips said reduced portion throughout its circumference and that is provided with an internal bead that fits in said circumferential groove, said collar having a portion disposed between the inner end of said bearing cup and said axis of rotation which defines a lubricant chamber opening outwardly from said axis to said inner end portion of said cup throughout its periphery, the outer end portion of said sealing collar retaining lubricant in said reservoir.

7. In a universal coupling, a yoke provided with an arm spaced laterally from the axis of rotation of the coupling, a cross having an arm extending outwardly from said axis of rotation and terminating in a trunnion that extends into an opening in said yoke, a sealed bearing for said trunnion comprising a bearing cup on said trunnion and positioned in said opening, said cup being held against turning movement in said opening and being removable outwardly through said opening, said cup having an inner end portion of reduced external diameter that is provided with a circumferential groove and a shoulder at the outer end of said reduced portion, and an elastic rubber sealing collar embracing said trunnion arm and having radially spaced inner and outer tubular portions defining a grease reservoir therebetween opening outwardly from said axis of rotation to the inner end of said cup, the inner of said tubular portions engaging the end of said cup, the outer of said tubular portions being normally of an internal diameter less than the external diameter of said reduced portion of said cup and being stretched around said reduced portion, said outer tubular portion having an internal bead that fits in said circumferential groove and grips said reduced portion throughout its circumference, the outer of said tubular portions being under axial compression between said shoulder and said trunnion arm and the inner of said tubular portions being under axial compression between the inner end of said cup and said trunnion arm.

8. In a universal coupling having a trunnion disposed at right angles to its axis of rotation, a sealed bearing for said trunnion comprising a bearing cup concentric to said trunnion and having a peripheral wall surrounding said trunnion and terminating adjacent the inner end thereof, said peripheral wall having an annular projection at its inner end that is of reduced external diameter, an elastic rubber sealing collar embracing said trunnion arm and having an annular recess shaped to receive said projection, said sealing collar being formed to provide an annular lubricant reservoir opening to the inner end of said peripheral wall, whereby during rotation of the coupling lubricant in said reservoir is subjected to centrifugal force tending to cause outward flow between the outer end of said collar and said bearing cup, the portion of said sealing collar forming the outer wall of said annular recess having gripping engagement with the exterior peripheral face of said projection to retain lubricant in said reservoir.

References Cited in the file of this patent

UNITED STATES PATENTS

| | | |
|---|---|---|
| 2,027,078 | Warner | Jan. 7, 1936 |
| 2,415,887 | Joy | Feb. 18, 1947 |
| 2,509,436 | Isenbarger | May 30, 1950 |